US009639266B2

(12) United States Patent
Medlock et al.

(10) Patent No.: US 9,639,266 B2
(45) Date of Patent: May 2, 2017

(54) USER INPUT PREDICTION

(75) Inventors: Benjamin Medlock, London (GB);
Douglas Alexander Harper Orr, Essex (GB)

(73) Assignee: Touchtype Limited, London (GB)

( * ) Notice: Subject to any disclaimer, the term of this patent is extended or adjusted under 35 U.S.C. 154(b) by 168 days.

(21) Appl. No.: 14/118,147

(22) PCT Filed: May 8, 2012

(86) PCT No.: PCT/GB2012/051006
§ 371 (c)(1),
(2), (4) Date: Nov. 15, 2013

(87) PCT Pub. No.: WO2012/156686
PCT Pub. Date: Nov. 22, 2012

(65) Prior Publication Data
US 2014/0108994 A1   Apr. 17, 2014

(30) Foreign Application Priority Data
May 16, 2011   (GB) .................................. 1108200.5

(51) Int. Cl.
| G06F 3/048 | (2013.01) |
| G06F 3/0488 | (2013.01) |
| G06F 3/023 | (2006.01) |

(52) U.S. Cl.
CPC ........ *G06F 3/04886* (2013.01); *G06F 3/0237* (2013.01)

(58) Field of Classification Search
CPC ........................... G06F 3/04886; G06F 3/0233
(Continued)

(56) References Cited

U.S. PATENT DOCUMENTS

| 4,559,598 A | 12/1985 | Goldwasser |
| 4,725,694 A | 2/1988 | Auer et al. |

(Continued)

FOREIGN PATENT DOCUMENTS

| CN | 1731331 A | 2/2006 |
| CN | 101071397 A | 11/2007 |

(Continued)

OTHER PUBLICATIONS

"Conjugate Bayesian Analysis of the Gaussian Distribution," Murphy, Kevin P., Oct. 3, 2007.*

(Continued)

*Primary Examiner* — Matthew Ell
(74) *Attorney, Agent, or Firm* — Baker & Hostetler LLP (57) ABSTRACT

The invention relates to a system and method that models a user's interaction with a user interface. There is provided a data input system, comprising a user interface having a plurality of targets and being configured to receive user input. The system comprises a plurality of models, each of which relates previous user input events corresponding to a target to that target. An input probability generator is configured to generate, in association with the plurality of models, a probability that a user input event corresponds to a particular target. There is also provided a method of modelling a target of a user interface having a plurality of targets and being configured to receive input, by modelling for each target previous user input events which correspond to that target. Furthermore, there is provided a method of inputting data into a system comprising a user interface having a plurality of targets and being configured to receive input. The method comprises generating using an input probability generator in association with a plurality of models, each model relating previous input, events corre- (Continued)

sponding to a target to that target, a probability that a user input event corresponds to a particular target.

21 Claims, 1 Drawing Sheet

(58) Field of Classification Search
USPC ........................................................ 715/773
See application file for complete search history.

(56) References Cited

U.S. PATENT DOCUMENTS

| | | | |
|---|---|---|---|
| 4,783,758 A | 11/1988 | Kucera | |
| 5,317,507 A | 5/1994 | Gallant | |
| 5,574,482 A | 11/1996 | Niemeier | |
| 5,612,690 A | 3/1997 | Levy | |
| 5,745,719 A | 4/1998 | Falcon | |
| 5,748,512 A * | 5/1998 | Vargas | G06F 3/04886 345/173 |
| 5,818,437 A | 10/1998 | Grover et al. | |
| 5,953,541 A | 9/1999 | King et al. | |
| 5,973,676 A | 10/1999 | Kawakura | |
| 6,002,390 A | 12/1999 | Masui | |
| 6,005,495 A | 12/1999 | Connolly et al. | |
| 6,011,554 A | 1/2000 | King et al. | |
| 6,286,064 B1 | 9/2001 | King et al. | |
| 6,307,548 B1 | 10/2001 | Flinchem et al. | |
| 6,307,549 B1 | 10/2001 | King et al. | |
| 6,346,894 B1 | 2/2002 | Connolly et al. | |
| 6,542,170 B1 | 4/2003 | Williams et al. | |
| 6,654,733 B1 * | 11/2003 | Goodman et al. | 706/52 |
| 6,801,190 B1 | 10/2004 | Robinson et al. | |
| 6,820,075 B2 | 11/2004 | Shanahan et al. | |
| 7,030,863 B2 | 4/2006 | Longe et al. | |
| 7,075,520 B2 | 7/2006 | Williams | |
| 7,083,342 B2 | 8/2006 | Griffin | |
| 7,088,345 B2 | 8/2006 | Robinson et al. | |
| 7,098,896 B2 * | 8/2006 | Kushler | G06F 3/04883 345/168 |
| 7,149,550 B2 | 12/2006 | Kraft et al. | |
| 7,155,683 B1 | 12/2006 | Williams | |
| 7,177,797 B1 | 2/2007 | Micher et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,475,010 B2 | 1/2009 | Chao | |
| 7,580,829 B2 | 8/2009 | James et al. | |
| 7,712,053 B2 | 5/2010 | Bradford et al. | |
| 7,750,891 B2 | 7/2010 | Stephanick et al. | |
| 7,752,152 B2 * | 7/2010 | Paek et al. | 706/20 |
| 7,920,132 B2 | 4/2011 | Longe et al. | |
| 8,074,172 B2 | 12/2011 | Kocienda et al. | |
| 8,225,203 B2 | 7/2012 | Unruh | |
| 8,441,454 B2 | 5/2013 | Longe et al. | |
| 8,589,149 B2 | 11/2013 | Cecil et al. | |
| 2002/0196163 A1 | 12/2002 | Bradford et al. | |
| 2004/0083198 A1 | 4/2004 | Bradford et al. | |
| 2004/0136564 A1 * | 7/2004 | Roeber et al. | 382/100 |
| 2006/0274051 A1 | 12/2006 | Longe et al. | |
| 2007/0152978 A1 | 7/2007 | Kocienda et al. | |
| 2008/0189605 A1 | 8/2008 | Kay et al. | |
| 2009/0007001 A1 | 1/2009 | Morin et al. | |
| 2009/0069392 A1 | 3/2009 | Watanabe et al. | |
| 2009/0284471 A1 | 11/2009 | Longe et al. | |
| 2010/0228539 A1 * | 9/2010 | Slocum et al. | 704/9 |
| 2010/0235780 A1 | 9/2010 | Westerman et al. | |
| 2010/0315266 A1 * | 12/2010 | Gunawardana et al. | 341/22 |
| 2011/0074704 A1 | 3/2011 | Causey et al. | |
| 2011/0099506 A1 | 4/2011 | Gargi et al. | |
| 2011/0179032 A1 | 7/2011 | Cuesters et al. | |
| 2011/0310019 A1 * | 12/2011 | Wilson | G06F 3/04886 345/168 |
| 2012/0010875 A1 | 1/2012 | Helletzgruber et al. | |
| 2012/0167009 A1 | 6/2012 | Davidson et al. | |
| 2012/0203544 A1 * | 8/2012 | Kushler | 704/9 |
| 2013/0067382 A1 * | 3/2013 | Townsend et al. | 715/773 |
| 2014/0074458 A1 | 3/2014 | Cecil et al. | |

FOREIGN PATENT DOCUMENTS

| | | |
|---|---|---|
| CN | 101390039 A | 3/2009 |
| CN | 101510124 A | 8/2009 |
| CN | 101876878 A | 11/2010 |
| CN | 102253929 A | 11/2011 |
| JP | H11143486 A | 5/1999 |
| JP | H11272386 A | 10/1999 |
| JP | 2009-522697 A | 6/2009 |
| TW | 201013466 A | 4/2010 |
| WO | WO 2007/082139 A2 | 7/2007 |
| WO | WO 2009/069392 A1 | 6/2009 |
| WO | 2010035574 A1 | 4/2010 |
| WO | WO 2010/112841 | 10/2010 |

OTHER PUBLICATIONS

Takahiro Hidaka; "SL-C700 Series Linux Zaurus, Plan for Environmental Upgrading"; Mobile Press; vol. 3 No. 4; Oct. 2003; p. 61-63.

Japan Patent Application No. 2014-510874; Office Action—Reasons for Rejection; dated Nov. 4, 2016; 9 pages (English Translation).

* cited by examiner

USER INPUT PREDICTION

CROSS-REFERENCE TO RELATED APPLICATIONS

This application is the National Stage of International Application No. PCT/GB2012/051006 filed May 8, 2012, which claims the benefit of Great Britain Patent Application No. 1108200.5, filed May 16, 2011, the disclosures of which are incorporated herein by reference in their entireties.

The present invention relates generally to a data input system which comprises a user interface. In particular, the user interface comprises a plurality of targets and is configured to receive user input. The present invention provides a method of modelling a target of a user interface of a system and a method of inputting data into a system in which the targets of a user interface have been so modelled.

Previously, work on enhancing user interaction with keyboards of limited size has provided a number of methods based on reduced-size keyboards, which do not cover the full range of characters for a given language. This is the subject of U.S. Pat. No. 6,307,549, which provides a method for disambiguating the output from a reduced keyboard (usually about 3 characters per key). Word-level disambiguation is provided using a selection button which enable a user to cycle through possible matches to the current input. An alternative reduced keyboard layout, based on the common QWERTY layout, is the 'half qwerty' layout provided by U.S. Pat. No. 7,083,342, which also uses extra post-input disambiguation.

Although reduced keyboards have a reduced error rate, they also quantize the input more roughly, meaning that there is less information content in the input the computer receives from a reduced keyboard than a full keyboard.

In theory, with an adequate error-correction system, a full keyboard with error correction should require less disambiguation keystrokes than a reduced keyboard. On a hard keyboard, an input event relates to a user pressing down on a key of the keyboard. For such keyboards, the user can press any location within the boundary of a key; the corresponding input event will be the same for all locations within that boundary. However, with touch-sensitive 'soft keyboards', it is possible to use the almost continuous co-ordinates of touches on the soft keyboard.

Many existing virtual keyboard systems, e.g. United States patent application publication number 2009/0284471 and predecessors, incorporate mechanisms for automatically 'correcting' user input in instances where the system receives a character that is not the one intended by the user. Such systems are based around the idea of associating a pre-specified set of locations, each designated by a set of Cartesian coordinates, with characters available for input by the user. Given a set of coordinates representing an input event, the distances between this event and surrounding pre-specified locations within an 'auto-correcting region' are used to construct a weighted set of characters assigned to that event. The auto-correcting region comprises a plurality of characters of the alphabet. During input, the user is presented with a set of 'objects' that are considered likely intended character sequences. As the user selects his/her intended input sequences, the (potentially weighted) horizontal and vertical offsets between the input event coordinates and the character coordinates are computed, and the relevant moving average used to calibrate input event coordinates to reflect a user's typing style. The moving average may be a running average where the coordinates of each key are set to the average of all previous input events for that key.

The above described existing virtual keyboards model each character as a location specified by a set of coordinates. In contrast, the system and method of the present invention models a user's actual input as he or she targets characters on a virtual keyboard. Thus, the system and method of the present invention models, for a given character, the user's input history for that character.

The system and method of the present invention provides a system that adapts to a user and learns the style in which a user inputs text. By modelling the user's historical interaction with the system, the present system is able to more accurately predict which character the user intended to input given an input event. Thus, the present invention provides a system which is capable of providing more accurate and reliable text predictions and thus providing more accurate text input into an electronic device. The increase in accuracy results in less correction, and therefore a system providing more efficient text entry and with a lower processing requirement.

In one embodiment, the present invention provides a data input system comprising a user interface comprising a plurality of targets and being configured to receive user input. The system comprises a plurality of models, each of which relates previous user input events corresponding to a target to that target. The system further comprises an input probability generator configured to generate, in association with the plurality of models, a probability that a user input event corresponds to a particular target.

The target can represent one or more characters, a key, a symbol or any other item of information which is for user selection.

Preferably, the user interface is a virtual keyboard. An input event may correspond to a location on the virtual keyboard and each model is a distribution which models locations of the user's previous input events corresponding to a particular target. This distribution may be a 2D Gaussian. Preferably, the parameters of the 2D Gaussian are learnt using maximum a-posteriori estimation based on the input events corresponding to the target. Preferably, the form of the prior distribution over model parameters is the conjugate prior to the distribution. Where the targets are keys on a virtual keyboard, a prior for each target may be set empirically based on a keyboard layout.

The virtual keyboard may comprise multiple sets of target models, each set of target models being tailored to a different user, or usage scenario.

The input probability generator in association with the plurality of models may output for a user input event the n most probable targets and their associated probabilities.

The system may comprise a map mapping each of the n targets to one or more word fragments with associated probability values. Preferably, each word fragment is tagged in the map with the target to which it corresponds.

The system may further comprise a predictor configured to receive the as most probable targets and their associated probabilities and to generate text predictions having probability values. The predictor may be configured to receive the word fragments and their associated probabilities and to generate text predictions having probability values.

Upon selection of a prediction, the target(s) of the prediction are matched to the corresponding input event(s). The targets of the prediction may be matched to the corresponding input events by the tagging of the word fragments of the prediction to their corresponding targets. Alternatively, the targets of the prediction may be matched to the corresponding input events by the reverse mapping of the word fragments to their corresponding targets and the pairing of the targets to the input events.

The selection of a prediction may comprise the user's selection of the prediction or the automatic selection of the most probable prediction. The selected prediction is preferably input into the data input system as text.

The system may also comprise a model updater configured to update a model to reflect mapping of an input event to the target corresponding to that model.

An electronic device may comprise the data input system as described above. The electronic device can be a computer, a PDA or a mobile telephone.

In a second embodiment, the present invention provides a method of modelling a target of a user interface comprising a plurality of targets and being configured to receive input, the method comprising modelling for each target user input events which correspond to that target.

Where the user interface is a virtual keyboard and an input event corresponds to a location on the virtual keyboard, the method may further comprise modelling each target as a distribution which describes the locations of the user's previous input events corresponding to the target. The distribution may be a 2D Gaussian. Each model must also comprise a prior, which may be conjugate to the distribution. Preferably, the parameters of the 2D Gaussian are learnt using maximum a-posteriori estimation based on the input events corresponding to the target. The targets are keys on the virtual keyboard and a prior for each target is set empirically based on a keyboard layout.

In a third embodiment there is provided a method of inputting data into a system comprising a user interface having a plurality of targets and being configured to receive input, the method comprising generating using an input probability generator in association with a plurality of models, each model relating previous input events corresponding to a target to that target, a probability that a user input event corresponds to a particular target.

Preferably, the method comprises outputting from the input probability generator for a user input event the n most probable targets and their associated probabilities. The method may also include mapping with a map each of the n targets to one or more word fragments with associated probability values. Preferably, the method comprises tagging with the map each of the one or more word fragments with the target from which it was mapped.

The method may comprise generating using a predictor configured to receive the n most probable targets and their associated probabilities text predictions having probability values. Preferably, the method comprises generating using a predictor configured to receive the word fragments and their associated probabilities text predictions having probability values. The method may comprise selecting a text prediction and matching using the predictor the target(s) of the text prediction to the corresponding input event(s). The matching of the target(s) of the text prediction to the corresponding input event(s) may comprise pairing the targets which are tagged to the word fragments with the input events. Alternatively, the matching of the target(s) of the text prediction to the corresponding input event(s) may comprise reverse mapping the word fragments to their targets and pairing the targets with the input events.

The method may further comprise updating a model using a model updater when an input event has been matched to a target.

The present invention will now be described in detail with reference to the accompanying drawing, in which.

The invention provides a system and method that utilises machine learning to model user interactions on a virtual keyboard. The three major activities of the system, in conjunction with a predictor, are evaluation, inference, and learning, and the system is structured around an iterative application of those activities. The system of the present invention can be incorporated into an electronic device, for example a PDA, a mobile phone or a computer.

Figure 1:
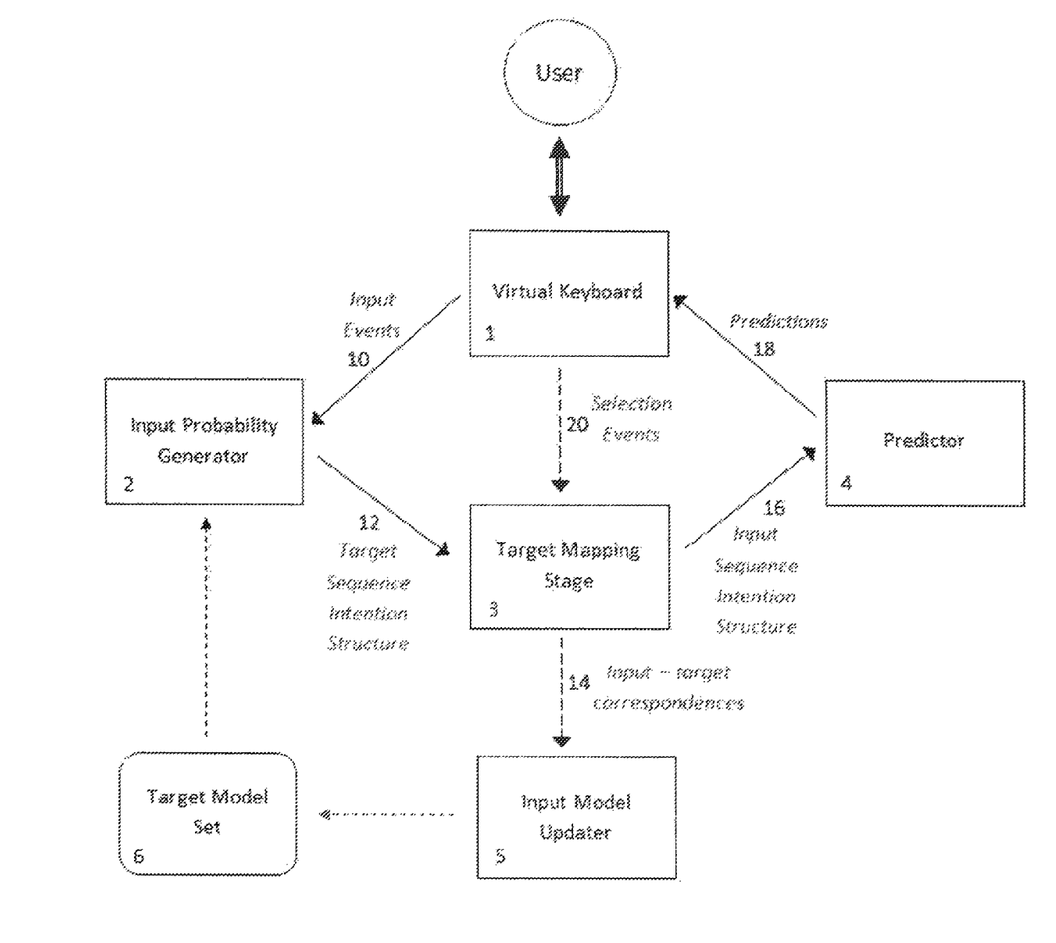
FIG. 1 is a schematic of a system architecture according to the invention.

Elements of the system will now be described with reference to FIG. 1.

The system of the present invention provides a user interface comprising a plurality of targets and being configured to receive user input. In the example provided in FIG. 1, the user interface comprises a virtual keyboard 1, e.g. a keyboard on a softscreen. The system is configured to interpret the user input as either an input event 10 or a selection event 20. An input event 10 is an event in which a user selects (e.g. by 'touch' or 'click') a location in 2D space on the virtual keyboard, this event being detected by the virtual keyboard 1 and represented as Cartesian coordinates. A selection event 20 is the selection by a user of a prediction 18 from a set of predictions displayed to the user. The virtual keyboard 1 may have input event regions and selection event regions to distinguish between an input event 10 and a selection event 20. However, there are other ways to interpret the user input as selection or input events, e.g. a selection event 20 may correspond to a different gesture on the keyboard (such as a swipe across the screen) to an input event 10 (which could correspond to, for example, a touch of the screen).

An input event 10 is not limited to being represented by Cartesian coordinates, but can also be represented by other variables such as time since the last key press, key press pressure, gesture information (the path traced by a touch on a softscreen keyboard), accelerometer readings etc.

For a soft keyboard, a selection event 20 relates to a user selecting the intended prediction by touching/clicking an area on the keyboard which displays that prediction, thus entering the prediction into the system. A selection event 20 may also relate to the automatic selection by the system of the most probable prediction when the user 'hits' 'space' to complete a word. There are other mechanisms for user selection of a prediction, for example a gesture on a soft keyboard such as a swipe-right across the screen can be a mechanism for inserting the most probable prediction. The selected prediction 20 corresponds to the character sequence a user intended to enter through the input events 10. Thus, by entering a selection event 20, the input events 10 entered by a user can be matched to their intended targets, as will be explained in more detail below.

The only requirement for the virtual keyboard 1 is that there are distinct 'target points' for the user, which correspond to intended input. The target points could be, but are not limited to, character keys (i.e. a grid of virtual or physical keys, as in normal qwerty keyboards); an arrangement of letter glyphs, e.g. as a grid with no visible key boundaries; or a linear letter line, A-Z. Thus, each target of the virtual keyboard 1 can represent single or multiple characters, or any other item of information for user selection. For the following examples, the focus is on text entry into a system. However, the system and method is not limited to the entry of text and is applicable to the entry of non-text data, where quanta of data are represented by target points on a user interface.

To generate predictions for presentation to a user, the system comprises a plurality of models 6 which model the user's previous input events for each of the plurality of targets; an input probability generator 2 which queries the plurality of models 6 with a given input event 10 and generates one or more likely targets and their probabilities; and a predictor 4 which generates text predictions 18 from the likely targets and their probabilities. In a preferred example, the system further comprises a word fragment map 3 which maps the likely targets to word fragments which are used by the predictor 4 to generate text predictions.

The input probability generator 2 receives an input event 10 and generates or updates a Target Sequence Intention Structure 12. The Target Sequence Intention Structure 12 contains one or more targets and for each target the probability that the user had intended to select that target through the input event 10. The Target Sequence Intention Structure 12 contains a correspondence between the input event 10 and the targets corresponding to that input event 10, for example by tagging the targets with the input event 10. The Target Sequence Intention Structure 12 can contain all of the targets of the system or it can contain only the targets which have an associated probability higher than a certain threshold probability value. The threshold value is a system parameter, that can be set empirically to a pre-defined level (e.g. $10^{-4}$). Alternatively, the threshold level might be determined by experiments with the user. As discussed in more detail below, to generate a probability of observing an input event 10 for a target, the input probability generator 2 queries a model set 6 with an input event 10, and evaluates for each target a probability value, which can be represented as a per-event probability vector. To reduce the computation, small values can be filtered out of the per-event probability vector. These per-event probability vectors are concatenated to form the Target Sequence Intention Structure 14, which forms the input to the next stage: target mapping 3.

The model set 6 comprises a plurality of trained models representing the plurality of targets (which may be characters) of the system. A target is modelled as a distribution which models the user's actual input if he was 'targeting' that target. The distribution that is being modelled is $p(x|c)$, where x is an input event position vector, and c is a label identifying a single target (a target identifies a set of possible intended characters).

In a preferred embodiment, this distribution is modelled as a multivariate Gaussian, $p(x|c, \mathcal{M}) = G(x; \mu_g, \Sigma_c)$, where $\mathcal{M}$ is the assumed model (encompassing all assumptions and parameters and $G(x; \mu, \Sigma)$ is shorthand for the Gaussian probability density function, mean $\mu$, covariance $\Sigma$, evaluated at x. The model parameters are $\mu_c$ and $\Sigma_c$ for each target c. The model parameters are learnt using maximum a-posteriori (MAP) estimation based on historical interaction with the keyboard. However, other learning mechanisms can be used, some of which are discussed later.

Rather than using a 2D Gaussian, the user's input can be modelled by independently distributing the x and y coordinates of the user's input events with a Laplace distribution. Alternatively, the user input can be modelled with a Gamma distribution. Laplace and Gamma distributions may be more appropriate than a Gaussian distribution because the distributions are more heavy-tailed, with the probability density decaying more slowly than that of a Gaussian as the input event (e.g. touch location) moves away from a target. Such heavy-tailed distributions may reflect the user's actual writing style more accurately, thus providing, potentially, better error correction performance. Other suitable modelling techniques can also be applied.

In order to obtain the MAP estimate for $\mu_c, \Sigma_c$, a prior distribution of those parameters must be specified. Where the targets relate to keys on a virtual keyboard, the priors (mean and covariance) can be set empirically based on a keyboard layout, a convenient choice for which is the normal inverse Wishart distribution, NIWD, as this is the conjugate prior of a Gaussian with unknown mean and covariance. Other prior distributions can be used, some of which are discussed later. The definition of conjugate priors states that if the prior is conjugate to the likelihood, the posterior is the same form of distribution as the prior (potentially with different parameters). The parameters of the conjugate distribution (both prior & posterior) are then termed hyperparameters (as they parameterize the distribution of the model's actual parameters), and MAP learning can be made into a relatively simple hyperparameter recalculation.

Thus, in an embodiment, learning simply entails recalculating the four NIWD parameters, an algorithm that is easily made incremental. The prior is therefore:

$$p(\mu_c, \Sigma_c | \mathcal{M}) = \text{NIWD}(\mu_c, \Sigma_c; \alpha_c^{prior}, \beta_c^{prior}, \hat{\mu}_c^{prior}, \hat{\Sigma}_c^{prior}),$$

and the posterior is:

$$p(\mu_c, \Sigma_c | \{x_i\}_{i=1 \ldots t}, \mathcal{M}) = \text{NIWD}(\mu_c, \Sigma_c; \alpha_c^{(t)}, \beta_c^{(t)}, \hat{\mu}_c^{(t)}, \hat{\Sigma}_c^{(t)}),$$

where $\alpha_c$ and $\beta_c$ are degrees-of-freedom hyperparameters for the mean and covariance respectively (a large degrees-of-freedom value means that the prior is strong, and learning is slow), and $\hat{\mu}_c, \hat{\Sigma}_c$ are the modal values of the mean and covariance respectively. $\alpha_c^{(t)}$ is the posterior value of the hyperparameter $\alpha_c$, after t observations, $\{x_i\}_{i=1 \ldots t}$, therefore $\alpha_c^{(0)} \equiv \alpha_c^{prior}$.

Working through the known hyperparameter update relations for the NIWD distribution, the general update rules for this parameterization are:

$$\alpha_c^{(t+n)} = \alpha_c^{(t)} + n,$$

$$\beta_c^{(t+n)} = \beta_c^{(t)} + n,$$

$$\hat{\mu}_c^{(t+n)} = \frac{n\bar{x} + \alpha_c^{(t)} \hat{\mu}_c^{(t)}}{n + \alpha_c^{(t)}},$$

$$\hat{\Sigma}_c^{(t+n)} = \frac{n(X + \bar{X}) + \beta_c^{(t)} \hat{\Sigma}_c^{(t)}}{n + \beta_c^{(t)}},$$

where, $$X = \sum_{i=1}^{n} (x_i - \hat{\mu}_c^{(t)})(x_i - \hat{\mu}_c^{(t)})^T,$$

$$\bar{X} = \frac{\alpha_c^{(t)}}{\alpha_c^{(t)} + n} (\bar{x} - \hat{\mu}_c^{(t)})(\bar{x} - \hat{\mu}_c^{(t)})^T,$$

where there are n observations, $\{x_i\}_{i=1 \ldots n}$, with mean $\bar{x}$. When applied to the prior, using all observations, this provides a batch-learning algorithm. An incremental learning algorithm can be formed by setting n=1, and reapplying the update formula to the posterior, i.e. $\alpha_c^{(t+1)} = \alpha_c^{(t)} + 1$.

As the mode of the NIWD is $(\hat{\mu}, \hat{\Sigma})$, the MAP estimate of the parameters after t observations is simply: $\mu_c = \hat{\mu}_c^{(t)}$, $\Sigma_c = \hat{\Sigma}_c^{(t)}$.

The NIWD is convenient because it is conjugate of the multivariate Gaussian, which gives simple and incremental learning rules. As an alternative, it is possible to use a uniform (uninformative) prior. A prior can be specified where the position and convariance are independent, e.g. the prior for position could be a Gaussian or uniform, and that for covariance could be the 'matrix normal distribution'.

The present example uses batch-mode and incremental learning algorithms, which compute the posterior in a single update from the prior, and by adding one observation at a time respectively. One of these learning algorithms runs when the user 'selects' a prediction by matching the locations of input events to the locations of characters which make up the selected prediction.

If a Laplace/Gamma distribution is chosen instead of a Gaussian distribution, the same process is followed as for the Gaussian: a prior is chosen (for example the conjugate prior) and learning rules are derived for the MAP learning goal.

As an alternative to MAP, Maximum Likelihood (ML) estimation is another choice for a learning mechanism, where the prior does not come into it, and the parameters are chosen such that the likelihood of observing the training data under the model is maximised. A further possibility would be to use a true Bayesian estimator (neither the ML nor MAP approaches are truly Bayesian because they both make point estimates), in which an integral is computed over all possible values of the posterior and the mean or median used for inference decisions. Disadvantageously these estimates are relatively costly to compute, and therefore currently less attractive for constrained resource environments. Examples of Bayesian estimators are Variational Bayes and Gibbs sampling.

The above described learning algorithm is a learning algorithm that accounts for each datapoint equally, whether recent or old, with a prior which is (intentionally) overwhelmed once a certain number of datapoints have been observed. In order to add a basic form of recency into the model, and some outlier tolerance by continually reinforcing the prior, two alterations can be made:

The first is simply to limit the degrees-of-freedom parameters $\alpha_c$, $\beta_c$, which has the effect of 'forgetting' old observations, and limiting how 'rigid' the model becomes (a 'rigid' model has such a high degrees-of-freedom value that new datapoints have very little effect). The limit is applied by not updating them if they would exceed the limit (an action which should not compromise the action of the other hyperparameter updates).

The second is to feed the other prior hyperparameters, $\hat{\mu}_c^{prior}$ and $\hat{\Sigma}_c^{prior}$, back into the update equations, such that they continue to have an effect even after many datapoints have been observed. This can be done relatively simply as the update equations are simply weighted averages of a few quantities, so it is reasonable to 'add in' some quantity of the prior, as follows:

$$\alpha_c^{(t+n)} = \min(\alpha_c^{(t)} + n, \alpha_{cmax}),$$

$$\beta_c^{(t+n)} = \min(\beta_c^{(t)} + n, \beta_{cmax}),$$

$$\hat{\mu}_c^{(t+n)} = \frac{n[(1-\delta)\bar{x} + \delta\hat{\mu}_c^{prior}] + \alpha_c^{(t)}\hat{\mu}_c^{(t)}}{n + \alpha_c^{(t)}}$$

$$\hat{\Sigma}_c^{(t+n)} = \frac{n[(1-\varepsilon)(X + \bar{X}) + \varepsilon\hat{\Sigma}_c^{prior}] + \beta_c^{(t)}\hat{\Sigma}_c^{(t)}}{n + \beta_c^{(t)}},$$

The additional parameters $\alpha_{cmax}$, $\beta_{cmax}$, $\delta$ and $\epsilon$ may be set empirically, as required. They control the 'asymptotic strength' of the prior, and the rate at which past observations are forgotten.

A single virtual keyboard 1 may need to maintain multiple separate target model sets 6, for example if a single system may be used by different users, or if the form factor of the virtual keyboard is variable. In some cases (e.g. a form factor change), the system may have sufficient information to explicitly choose a different input model, but in the case of multiple users, the appropriate model choice may not be obvious. In this situation, an element of model selection can assist.

A robust way to perform model selection, is to evaluate the data likelihood over a number of samples. This can be achieved as follows, where data likelihood is expressed as:

$$\log \mathcal{L} \ (\{x_i\}_{i=1...n} | \mathcal{M}) = \sum_{i=1}^{n} \log p(x_i | \mathcal{M}),$$

where $\mathcal{L}(D|\mathcal{M})$ is the likelihood of observing the data D under the model $\mathcal{M}$. This can be written as, $$\log \mathcal{L} \ (\{x_i\}_{i=1...n} | \mathcal{M}) = \sum_{i=1}^{n} \log \sum_{j} p(x_i, c_j | \mathcal{M}),$$

$$\log \mathcal{L} \ (\{x_i\}_{i=1...n} | \mathcal{M}) = const + \sum_{i=1}^{n} \log \sum_{j} p(x_i | c_j, \mathcal{M}),$$

where the prior over targets, $p(c|\mathcal{M})$, may be extracted into a constant if we assume it is uniform.

This log-likelihood statistic can be computed by querying multiple models at the Input probability generator stage at once, summing the output over all targets, and selecting the model for which the calculated log-likelihood of some 'seed input' is highest.

The model presented up to this point has incorporated the assumption that each key-press in a sequence is independent of all others, an assumption that is clearly inaccurate (the distribution of input for a certain key is probably quite strongly dependant on the last character entered). A first-order Markov assumption might be more appropriate: that the current character input is conditionally independent of all previous characters, given just the last character entered. The probability of an entire input sequence would then be:

$$p(\{x_i\}_{i=1...t} | \{c_i\}_{i=1...t}, \mathcal{M}) = p(x_1 | c_1, \mathcal{M}) \prod_{i=2}^{n} p(x_i | c_i, x_{i-1}, \mathcal{M}),$$

where all tens are as previously described above. A critical modelling decision is then to assume a form for the conditional probability of a touch location, $p(x_i|c_i,x_{i-1},\mathcal{M})$. One choice of distribution would first classify the previous touch location, x, with a separate Gaussian for each target and class of previous input location. Another possible choice would be to use the distance traveled, $d=\|x_i-x_{i-1}\|$, to control the variance of the per-target input distribution. The form of this distribution should be chosen to model typical data collected from virtual keyboard users.

A model set 6 can be i) queried by the input probability generator 2 to return the current MAP estimate of the model parameters; and ii) trained by an input model updater 5 in order to update the models in response to a selection event.

Model parameters may be stored on a per-key basis, or (in the case of covariance), shared among multiple keys. In the example described, each key/target has a position and covariance value. The alternative is to provide each key with a location, but force keys to share a covariance—when any of the keys are trained, the same covariance is trained. The exact representation of the parameters is flexible; it may be, for example, more convenient to store the precision matrix rather than the covariance, as this does not require a matrix inversion during probability generation, but does require an inversion in the less frequent case of model training.

Thus, given an input event 10, the input probability generator 2 generates a probability $p(x|c, \mathcal{M})$, for each target c, that the user had intended to select that target by the input event 10. To generate the probability value for a given target, the input probability generator 2 queries the model for that target to return the current MAP estimate of the model parameters, $\mu_c, \Sigma_c$. The input probability generator 2 then uses the model parameters to calculate the value of the Gaussian probability density function, $G(x;\mu,\Sigma)$, evaluated at the input location x. The calculated probability value can be represented as a per-event probability vector, which can be concatenated to form part of the Target Sequence Intention Structure 14.

In a preferred embodiment, the system further comprises a target mapping stage 3. The target mapping stage 3 comprises a word fragment map which provides a mapping from target inputs to word fragments (usually one or two characters) that can be used to build predictions. This mapping is applied independently to each element in the Target Sequence Intention Structure 12 in order to convert it into an Input Sequence Intention Structure 16. The word fragment map maintains a mapping from a target (a location on a keyboard, an abstraction of a key) to one or more word fragments (portions of a word that the user wants to enter). In the simplest case, each target refers to a single word fragment (e.g. when typing English on a full qwerty keyboard). Where there are alternative characters associated with each key (e.g. French accented characters or where each key represents multiple characters), those characters may be added as additional word fragments. The probabilities corresponding to each target may additionally be discounted by some factor for each alternative word fragment. The sets of possible word fragments and probabilities for each event in the sequence are then assembled into an Input Sequence Intention Structure 16.

The target mapping stage 3 also maps the word fragments of a selected prediction 20 back to their corresponding target events. In a preferred embodiment, each of the word fragments is tagged with the target from which it came to allow the pairing by a predictor 4 of a target to its touch location when a selection event has occurred. This can be achieved by tagging each word fragment with its corresponding target and input event. Thus, to un-map is a trivial pairing of touch-locations and targets. However, instead of tagging the word fragments, the system can use other mechanisms to map the word fragments of a selected prediction 20 back to their corresponding target events. For example, in an alternative embodiment, the target mapping stage 3 comprises a reverse mapping of the word fragments of a selected prediction back to their corresponding targets. To achieve the reverse mapping the selected prediction 20 and the corresponding string of input events are passed to a splitting mechanism. The splitting mechanism may split the prediction 20 into word fragments by evaluating the combination of word fragments with the highest probability for that selected prediction 20. The word fragments are then reverse mapped at the target mapping stage 3 to their targets and paired with the string of input events. In the simplest implementation of such a mechanism, the word fragments comprise single characters and the splitting mechanism splits the prediction into single characters to be mapped back to the targets. In this situation, the splitting may be carried out by the predictor 4.

To generate text (or similar) predictions 18, the system comprises a predictor 4. A predictor 4 is a device which, given some input, which in this case comprises an Input Sequence Intention Structure 16 containing a sequence of sets of 'word fragments' and probabilities, generates a set of predictions 18. Each prediction 18 consists of a text string, i.e. a term or phrase (denoted by s_i) and a probability value, denoted by p_i. The set of predictions is therefore of the form {(s_1, p_1), (s_2, p_2) . . . (s_n, p_n)}, where there are n predictions in a set.

As one skilled in the art will understand, any type of predictor 4 and any number of predictors 4 can be used to generate text predictions in a text prediction system. Preferably, the predictor 4 generates text predictions 18 based on the context of the user inputted text, i.e. the predictor 4 generates text predictions 18 for the nth term, based on up to n−1 terms of context. Here, "context" denotes both the terms that have occurred previously in the sequence, as well as any knowledge the system has about the current term (e.g. the likely word fragments contributing to the term). Given a particular context, the system predicts the words that are most likely to follow by using estimates of probabilities. The predictions 18 can be generated by a multi-language model as well as a single language model predictor.

A thorough description of the use of a predictor (single and multi-language model) to generate text predictions is presented in international patent application publication number WO2010/112841, "System and method for inputting text into electronic devices", which is incorporated herein by reference in its entirety. Furthermore, a thorough description of the use of an adaptive predictor (single and multi-language model) to generate category-weighted text predictions is presented in international patent application number PCT/GB2010/001898, "System and method for inputting text into electronic devices", which is incorporated herein by reference in its entirety.

The predictor 4 of the system receives as its input an input Sequence Intention Structure 16 containing a sequence of sets of 'word fragments' and probabilities, and generates a set of predictions 18 which are displayed to the user. The predictor 4 may be configured to return matches for which the Input Sequence Intention Structure 16 completes an entire word or return likely words of which the Input Sequence Intention Structure 16 is a prefix, e.g. in the case where the Input Sequence Intention Structure comprises the word fragments t and o and the word may be predicted as 'to' (completing the word) or 'together' (the word fragments are a prefix for the word). The Input Sequence Intention Structure 16 need only be used as a guide; it may, for example, add additional characters as if the user has missed some or ignore characters as if the user has entered extra characters. A single path through the Input Sequence Intention Structure 16 must be identified by each prediction 18, so that an association can be made between input events and targets. Each target has already been mapped by the word fragment map at the target mapping stage 3 to one or more word fragments, depending on language, which are unique. Furthermore, in the preferred embodiment, the Input Sequence Intention Structure 16 stores the tagging of the word fragments to their targets and input events. Thus, the selection of a prediction provides a correspondence between input events 10 and targets, because the predictor 4 tracks the targets used to compose the prediction, via the tagging of the word fragments with their corresponding targets. In an embodiment in which the unmapping comprises a reverse mapping, a splitting mechanism splits the selected prediction 20 into a combination of word fragments and the word fragment map is used to provide a reverse mapping of the word fragments to their corresponding targets. Each target is then paired with its respective input event 10.

The system also comprises an input model updater 5. The input model updater 5 receives input event to target correspondences 14 in response to a selection event 20. The selection event 20 identifies the targets which the user had intended to input and thus allows the predictor 4 to match the targets to the input events 10. The input model updater 5 updates the appropriate models, preferably (for memory usage and efficiency) using the incremental variant of the learning algorithm. The input model updater 5 applies the incremental learning update rules to the plurality of models in response to each selection event 20 on the virtual keyboard 1. The input is a set of input locations paired with targets $\{(x_i, c_i)\}_{i=1 \ldots k}$, each of which can be used as a single training point, $x_i$, for a single target, $c_i$. The prior hyperparameters and learning parameters are all set to fixed values—these set the initial target positions and expected accuracy, as well as controlling the speed at which learning takes place. Each model can be considered in isolation. By doing so, the training data is required to be labelled, i.e. input events require association with target labels. The labelling is not provided in the data, which is a stream of input events 10 and targets, so must be inferred from selection events 20. As described previously, one way of associating input events 10 with targets is to tag the word fragments with their targets and input events 10 in the Input Sequence Intention Structure 16. Once a prediction is selected, the word fragments making up the prediction are known. Thus, the targets tagged to the word fragments can be paired to the input events, providing labelled training data. Alternatively, the targets of a selected prediction can be determined by reverse mapping word fragments to their targets at the target mapping stage 3. The targets so determined can then be paired to the input events 10.

Thus, the present invention provides a system which models user input events for a plurality of targets and updates those models with user input, to provide a system which is able to more accurately predict which character the user intends to input given an input event and thus provide more accurate text predictions.

The use of the present system will now be described by way of a non-limiting example. A user interacts with a continuous coordinate system of a virtual keyboard 1 by entering input, for example by touching a location on a touch-sensitive keyboard 1. The user touches a location on the keyboard 1 with the intent of entering a target displayed on the keyboard 1. The keyboard 1 builds up a stream of input events 10 (which in the present example are Cartesian coordinates representing the locations of the touches on the keyboard) which is passed to an input probability generator 2.

The input probability generator 2 generates or updates a Target Sequence Intention Structure 12. In the instance where the targets of the keyboard represent characters, the Target Sequence Intention Structure 12 contains one or more characters corresponding to the most likely characters the user had intended to input when the touched the screen. Associated with each of the characters is a probability that the user had intended to enter that character when he touched the screen at the location and a tag to the input event 10. To generate the Target Sequence Intention Structure 12 the input probability generator 2 calculates the probability that the user had intended to enter each of the one or more characters by querying the associated model for each character with the input event 10. As discussed above, each model models the user's historical interaction with the keyboard for that character, i.e. it models the user's previous input events for that character. The input probability generator 2 then, preferably, retains the characters with an associated probability above a threshold probability value, where the threshold value is set empirically to a pre-defined level (e.g. $10^{-4}$) or is determined by experiments with the user.

The Target Sequence Intention Structure 12 is passed to a word fragment map which maps each character of the Target Sequence Intention Structure 12 to one or more word fragments with associated probabilities, thus generating an Input Sequence Intention Structure 16. Each character of the one or more characters is independently mapped to one or more word fragments, where the word fragments are tagged with the characters from which they came. The probabilities associated with the word fragments need not be the same as the probability associated with the character. For example, when mapping, the probability associated with a character may be multiplied by an additional factor dependent on the word fragment. The word fragment map may be a fixed map stored in a memory of the system. The map varies with the language used, e.g. the punctuation will differ with the chosen language and accented characters, umlauts etc. may feature in the word fragments dependent on the chosen language of the system.

Preferably, the word fragment map comprises targets mapped to word fragments, where the word fragments are tagged with the targets from which they came.

The Input Sequence Intention Structure 16 contains the word fragments, preferably tagged to the characters and input events from which they came, and probabilities corresponding to a sequence of input events 10. From the Input Sequence Intention Structure 16, the predictor 4 generates a number of predictions 18 by identifying a single path through the Input Sequence Intention Structure 16 for each prediction 18, i.e. by passing through the word fragments and generating a prediction sequence comprising a single word fragment for each of the input events 10. By identifying a single path through the Input Sequence Intention Structure 16, an association 14 can be made between input events 10 and targets. The predictor considers a number of the most probable paths through the Input Sequence Intention Structure 16, optionally also considering all words for which that path is a prefix. This is then fed into an n-gram language model to give an ordering of prediction candidates. An implementation of this process is described in international patent application publication number WO2010/112841, which is hereby incorporated by reference in its entirety.

The virtual keyboard 1 may be configured to display the predictions generated by the predictor. The selection 20 of the correct prediction can be achieved by either user selection of a given prediction displayed to the user or auto-accepting by the system of the most probable prediction. The predictor 4 is configured to track via the Input Sequence Intention Structure 16 which word fragments are used to compose a prediction, so that, upon user selection 20, the input events 10 are matched 14 to their targets. If the Input Sequence Intention Structure 16 comprises the word fragments tagged with their targets, the predictor 4 is configured to track the target tags, such that matching input events 10 to their targets comprises pairing the input events 10 to their targets. Alternatively, the word fragments are first matched to their corresponding targets by reverse mapping at the target mapping stage 3, before these targets are paired with the input events 10. The input events 10 paired with their targets are forwarded to the input model updater 5, which updates the relevant models of the set of models 6.

An example is now discussed, to illustrate the functioning of the system. In the example, a user is trying to enter the word "it's" on a virtual keyboard 1 (qwerty layout).

The user touches the screen very near to the first character T. The virtual keyboard 1 generates an input event 10 (e.g. Cartesian coordinates) representing that location, and sends it to the input probability generator 2.

The input probability generator 2 evaluates all of the target models 6, computing how likely they are to correspond to this input event. The input probability generator filters out low-probability targets by retaining only those with a probability above a predetermined threshold (which is set empirically or through experiment with the user). In the present example, the resulting Target Sequence Intention Structure 12 is [(@I, 1.0), (@O, 0.2), (@U, 0.2), (@K, 0.15), (@J, 0.1)], where @I is the target corresponding to the character 'i'.

The target mapping stage 3 transforms each target into a number of alternative word fragments, e.g. @I→i, ï, 'i. The target mapping stage 3 maps targets to word fragments and tags each word fragment with the target from which it came. The resulting Input Sequence Intention Structure 16 is: [(i, 1.0; @I), (ï, 1.0; @I), ('i, 1.0; @I), (o, 0.2; @O), ('o, 0.2; @O), (ö, 0.2; @O), (ó, 0.2; @O), . . . ]

The predictor 4 then uses this, and any available word context, to generate predictions 18 to be fed back to the user. The predictor 4 might, for example, predict: ["I", "I'm", "in"].

The user then makes a second touch event, quite far from the second character 't', actually closer to 'r'. The virtual keyboard 1 sends both touch events 10 ('i' & 't') to the input probability generator 2.

The input probability generator 2 now generates a sequence of probability vectors: {[(@I, 1.0), (@O, 0.2), . . . ], [(@R, 0.8), (@T, 0.6), (@E, 0.1), . . . ]}

The target mapping stage 3 is applied to each event in the sequence independently, with the word fragments tagged to their targets: {[(i, 1.0; @I), (ï, 1.0; @I), . . . ], [(r, 0.8; @R), ('r, 0.8; @R), (t, 0.6; @T), . . . ]}

The predictor 4 makes predictions 18: ["it", "it's", "or"] which are displayed to the user. The predictions may be displayed by the virtual keyboard. The user selects the prediction "it's". The virtual keyboard 1 creates a selection event 20 and the predictor matches the two touch events 10 to the targets of the prediction 18. The un-mapping stage is a trivial pairing of touch-locations and targets, because the system keeps track of the list of targets and input events that make up each prediction via the tagging of the word fragments with their targets and input events.

The predictor 4 pairs the locations at which the user touched the screen to their targets (touch-1→@I), (touch-2→T). The input model updater 5 then updates the model for @I, which will likely be tightened (as the first touch event was very accurate), and the model for @T, which will likely be loosened (as the second touch event was not as accurate).

The above example relates to a target representing a single character. However, a target may represent multiple characters. If a target represents multiple characters e.g. A/B/C, the model for that target models the user input events corresponding to the target A/B/C. Where the selected prediction 18 comprises A, B or C, the target A/B/C is mapped back to the input event.

By modelling a user's historical interaction with a virtual keyboard, the present method is able to accurately predict the characters which the user had intended to enter when touching the screen.

It will be appreciated that this description is by way of example only; alterations and modifications may be made to the described embodiment without departing from the scope of the invention as defined in the claims.

The invention claimed is:

1. A system, comprising:
   a display;
   a processor;
   memory storing instructions that, when executed by one or more processors, configure the one or more processors to:
   output a plurality of targets to the display, each of the plurality of targets representing a selectable item of information;
   receive a user input event associated with a selection of at least one target of the plurality of targets on the display, wherein the user input event corresponds to a location on the display; and
   generate in response to the user input event n most probable targets of the plurality of targets, wherein the n most probable targets are generated using a plurality of models, wherein each of the plurality of models is associated with a given one of the plurality of targets and models locations of previous input events corresponding to the given one of the plurality of targets when the user intended to select the given one of the plurality of targets, wherein:
   a plurality of target model sets are associated with the plurality of models, and
   selection of the plurality of models is performed by evaluating data likelihood over a number of samples of the target model sets.

2. The system according to claim 1, wherein the instructions, when executed by the one or more processors, configure the processor to generate, using the plurality of models, a probability for each of the n targets that the user input event corresponds to the selection of the target.

3. The system according to claim 1, wherein the display is a virtual keyboard and the user input event corresponds to a location on the virtual keyboard.

4. The system according to claim 1, wherein each model is a distribution which models locations of the previous input events corresponding to the given one of the plurality of targets.

5. The system according to claim 2, further comprising instructions that, when executed by the one or more processors, configure the one or more processors to map each of the n targets to one or more word fragments with associated probability values.

6. The system according to claim 5, wherein each word fragment is tagged by the one or more processors with the target to which it corresponds.

7. The system according to claim 5, wherein the instructions, when executed by the one or more processors, configure the one or more processors to generate text predictions having probability values based on the word fragments and their associated probabilities.

8. The system according to claim 7, wherein upon selection of a text prediction, at least one target of the text prediction is matched by the one or more processors to at least one corresponding input event.

9. The system according to claim 8, wherein the targets of the text prediction are matched to corresponding input events by reverse mapping of the word fragments to corresponding targets and pairing of the corresponding targets to the corresponding input events.

10. The system according to claim 8, wherein the selection of the text prediction comprises the selection of the text prediction or automatic selection by the one or more processors of a most probable prediction.

11. The system according to claim 9, wherein the instructions, when executed by the one or more processors, configure the one or more processors to update a model to reflect a mapping of the input event to the target corresponding to the model.

12. A method comprising:
outputting, using one or more processors, a plurality of targets to a display, each of the plurality of targets representing a selectable item of information;
receiving a user input event associated with a selection of at least one target of the plurality of targets on the display, wherein the user input event corresponds to a location on the display; and
generating, using the one or more processors, in response to the user input event n most probable targets of the plurality of targets, wherein the n most probable targets are generated using a plurality of models, wherein each of the plurality of models is associated with a given one of the plurality of targets and models locations of previous input events corresponding to the given one of the plurality of targets when the user intended to select the given one of the plurality of targets, wherein:
a plurality of target model sets are associated with the plurality of models, and
selection of the plurality of models is performed by evaluating data likelihood over a number of samples of the target model sets.

13. The method of claim 12, further comprising:
generating, using the one or more processors and the plurality of models, a probability for each of the n targets that the user input event corresponds to the selection of the target.

14. The method of claim 13, further comprising:
mapping, using the one or more processors, each of n targets to one or more word fragments with associated probability values.

15. The method of claim 14, further comprising:
generating, using the one or more processors, text predictions having probability values from the one or more word fragments and the associated probability values.

16. The method of claim 15, further comprising:
receiving a selection of a text prediction; and
matching, using the one or more processors, at least one target of the text prediction to at least one corresponding input event.

17. The method of claim 16, further comprising:
updating, using the one or more processors, the model associated with a given target, when the input event has been matched to the given target.

18. A non-transitory computer readable medium embodying a program of instructions executable by a device to perform program steps for operating a touchscreen interface on the device, the program steps comprising:
displaying a plurality of targets on the touchscreen interface, each of the plurality of targets representing a selectable item of information;
receive a user input event corresponding to a touch location on the touchscreen interface, wherein the user input event corresponds to a location on the display; and
generate in response to the user input event n most probable targets of the plurality of targets, wherein the n most probable targets are generated using a plurality of models, wherein each of the plurality of models is associated with a given one of the plurality of targets and models locations of previous input events corresponding to the given one of the plurality of targets when the user intended to select the given one of the plurality of targets, wherein:
a plurality of target model sets are associated with the plurality of models, and
selection of the plurality of models is performed by evaluating data likelihood over a number of samples of the target model sets.

19. The non-transitory computer readable medium of claim 18, further comprising the program steps of:
generating, using the plurality of models, a probability for each of the n targets that the user input event corresponds to the selection of the target.

20. The non-transitory computer readable medium of claim 19, further comprising the program steps of:
generating text predictions from the n most probable targets and their associated probabilities.

21. The non-transitory computer readable medium of claim 20, further comprising the program steps of:
outputting to the touchscreen interface the one or more word predictions based on the probable targets;
receiving a selection of a word prediction from the one or more word predictions displayed on the touchscreen interface;
matching at least one target of the text prediction to at least one corresponding input event; and
updating at least one of the models associated with at least one the matched targets with the at least one corresponding input event.

* * * * *